United States Patent Office

Re. 25,630
Reissued Aug. 4, 1964

25,630
CORROSION RESISTANT COATING

Newell C. Cook, Schenectady, N.Y., assignor to General Electric Company, a corporation of New York No Drawing. Original No. 3,024,177, dated Mar. 6, 1962, Ser. No. 831,494, Aug. 4, 1959. Application for reissue Mar. 6, 1964, Ser. No. 360,789
13 Claims. (Cl. 204—39)

Matter enclosed in heavy brackets [ ] appears in the original patent but forms no part of this reissue specification; matter printed in italics indicates the additions made by reissue.

This invention relates to the formation of a corrosion resistant coating on a metal composition, and more particularly to a corrosion resistant coating for a metal composition wherein the coating is an alloy whose constituents comprise the metal and silicon. Still more particularly, this invention is concerned with the formation of a silicide coating on a metal composition wherein the silicide coating comprises an alloy of silicon and the metal, and to the novel compositions obtained thereby.

The usual process for the preparation of a silicide coating on a metal comprises exposing the metal to the vapors of a silicon halide at a temperature sufficient to cause the halide to decompose and deposit a coating of silicon on the metal. The metal must then be heated to a still higher temperature to cause the silicon to diffuse into and alloy with the metal. In the absence of a reducing gas, a displacement reaction occurs in which some of the metal replaces the silicon in the silicon halide. In the presence of hydrogen, the silicon halide is reduced to silicon and hydrogen halide. In order to obtain satisfactory deposition rates, temperatures in the order of 1200–1400° C. are required. The deposition rate must be carefully controlled since rapid deposition results in the formation of a silicide undercoating with a fused silicon coating as the outermost layer. In order to obtain an adherent coating, it is usually required to deposit a very thin coating followed by a hydrogen soak to diffuse the coating into the metal. Additional coatings are made in the same manner to produce the desired thickness. This method is completely unsatisfactory for the production of high precision machined parts which must be accurately machined to very close tolerances before they are silicided. The parts warp causing the dimensions to exceed tolerance limits because of the distortion caused by the high temperatures and the phase transitions to which the article is subjected in heating and cooling especially when repeated steps are required to produce the desired thickness of coating. The rate of deposition of the silicon is very dependent on the velocity of the silicon halide over the surface and the temperature of the article being coated. Since these conditions are difficult to control, especially for large or irregularly shaped articles, the coatings are usually not uniform over the entire surface.

Iron and steel silicides have been made by electrolysis of a fused sodium silicate bath heated to 1100° C. using sodium fluoride as a flux. A graphite anode is used with the iron or steel wire as cathode. High current densities at 3 volts are required. The metal silicde forms as a loose, crystalline powder which is easily removed from the surface and, therefore, is completely unsatisfactory as a corrosion resistant coating on the iron or steel article.

Unexpectedly, I have discovered that a uniform, adherent, tough, corrosion resistant silicide coating can be formed on a specific group of metals without an overlying layer of silicon by immersing the selected metal and silicon in a fused bath composed esssentially of at least one alkali metal fluoride and from 0.5 to 50 mole percent of at least one alkali metal fluosilicate (alternatively called alkali metal silicofluoride), so that at least a portion of the bath isolates the metal from the silicon. The alkali metal fluosilicate may be added as such or formed in situ as explained later. I have found that such a combination is an electric cell in which an electric current is generated when an electrical connection, which is external to the fused bath, is made between the metal and silicon. Under such conditions, the silicon dissolves in the fused bath and silicon ions are discharged at the surface of the metal where they form a deposit of silicon which immediately diffuses into and reacts with the metal to form a silicide coating. I have discovered that the rate of dissolution and deposition of the silicon is self-regulating so that the silicon is never deposited at a rate faster than it diffuses and alloys with the metal. If a slower rate is desired, it can be easily controlled by means well known in the art such as by the amount of resistance in the circuit, surface area exposed to the bath, etc. A limited amount of voltage may be impressed upon the electrical circuit to supply additional direct current if a faster rate is desired.

This invention will be easily understood by those skilled in the art from the following detailed description. The metals which may be silicided by my process are those having atomic numbers 23–29 inclusive, 41–7 inclusive, and 73–79 inclusive. This range of atomic numbers includes those metals included in the Periodic Chart of the Elements shown on pages 56 and 57 of Lange's "Handbook of Chemistry," 9th Edition, Handbook Publishers, Inc., Sandusky, Ohio, 1956, as the group IB metals which are copper, silver, and gold, the group VB metals, which are vanadium, niobium, and tantalum, group VIB metals, which are chromium, molybdenum and tungsten, the group VIIB metals, which are manganese, technetium and rhenium, and the group VIII metals which are iron, cobalt, nickel, ruthenium, rhodium palladium, osmium, iridium, and platinum. Alloys of one of these metals with at least one of the others in any proportion, or alloys containing one or more of these metals as the major phase, i.e., over 50 mole percent, but usually over 75 mole percent and preferably at least 90 mole percent, alloyed with any one or more of the other metals of the periodic system of elements as the minor phase constituent, i.e., less than 50 mole percent, but usually less than 25 mole percent and preferably less than 10 mole percent, can also be silicided by my process, providing that the melting point of the resulting alloy is not lower than 600° C. The fact that other metals may be the minor constituents of an alloy with the metals with which this invention is concerned does not prevent the formation of the desired silicide coating on the object. These minor constituents may be any of the other metals of the period system, i.e., the metals of groups IA, IIA, IIB, IIIA, IIIB, IVA, IVB, VA, and VIA. These metals have atomic numbers 3–4 inclusive, 11–13 inclusive, 19–22 inclusive, 30–32 inclusive, 37–40 inclusive, 48–51 inclusive, 55–72 inclusive, 80–84 inclusive, and 87–98 inclusive. In the specification and claims I use the term "silicide" to designate any solid solution or alloy of silicon and metal regardless of whether the metal does or does not form an intermetallic compound with silicon in definite stoichiometric proportions which can be represented by a chemical formula. For example, molybdenum forms a compound with silicon which can be represented by the formula $MoSi_2$, but gold forms only a solid solution with silicon.

The alkali metal fluorides and fluosilicates which can be used for making the fused bath are the fluorides and fluosilicates of lithium, sodium, potassium, rubidium, and cesium. Since it is desirable to use as low a temperature as practicable to avoid damaging or distorting the article to be silicided, mixtures of one or more of the fluorides with one or more of the fluosilicates may be used to provide salt baths having lower fusion temperatures than the individual components.

In order to produce a reasonably fast plating rate and to insure the diffusion of the silicon into the metal to form the silicide, I have found it desirable to operate my process at a temperature no lower than about 600° C. even though the bath has a much lower melting temperature. Although lower temperatures may be used, there is some likelihood that the silicon will plate out onto the surface of the metal without diffusing into the metal.

The alkali metal fluosilicate is in equilibrium with silicon tetrafluoride and the alkali metal fluoride. Increasing temperatures favor the decomposition of the alkali metal fluosilicate. At temperatures exceeding 800° C., the vapor pressure of the silicon tetrafluoride becomes sufficiently high that it volatilizes from the fused salt bath. This loss can be prevented by using superatmospheric pressure. To avoid this difficulty, I usually prefer to operate at temperatures no greater than about 800° C.

Because of the equilibrium reaction, it is possible to form the desired alkali metal fluosilicate directly in the fused salt bath by dissolving silicon tetrafluoride in the fused bath of the alkali metal fluoride. The amount of alkali metal fluosilicate in the bath should normally be at least 0.5% and can be as high as 50% based on molar concentration. Usually, I use a concentration in the range of 1–5% on a molar basis. Amounts less than 0.5% can be used but seriously affect the quality and rate of silicide formation. Amounts greater than 5% offer no disadvantage but represent an uneconomical amount since the higher concentration does not speed the formation of the silicide coating but does increase the partial pressure of silicon tetrafluoride and, therefore, its loss by volatilization.

The chemical composition of the fused salt bath appears to be critical. The starting salts should be as anhydrous and as free of all impurities as possible, or should be easily dried or purified by simply heating during the fusion step. The role of impurities has not been definitely established, but it appears that many things can interfere with the electrode reactions and make for poor siliciding. Oxides appear to end up as silicates and, on reduction at the cathode, form silicon monoxide which separates out and interferes with the siliciding reaction. Oxygen also interferes so the process must be carried out in an oxygen-free atmosphere, for example in an inert gas atmosphere or in a vacuum. Sulfates appear to interfere most drastically, probably to give sulfur which diffuses into the metal and makes it impossible or extremely difficult to obtain good siliciding. Other metal compounds can also cause the formation of poor quality silicide coatings. Best results are obtained by starting with reagent grade salts and by carrying out the process under vacuum. I have sometimes found that even commercially available reagent grade salts must be purified further in order to operate satisfactorily in my process. This can easily be done by utilizing scrap articles, preferably of the same metal to be used later, to carry out initial siliciding runs, with or without an additional applied voltage, thereby plating out and removing from the bath those impurities which interfere with the formation of a high quality silicide coating. Carrying out the process in a vacuum also aids the process by volatilizing impurities and interfering substances, such as water. It is also desirable to thoroughly clean the metal surface before introduction into the fused salt, such as by pickling with or without an abrading treatment.

Also, I have found that to obtain a uniform silicide coating over large areas, it is highly desirable to use a porous, conducting container which is inert under the process conditions, for example, a graphite basket with holes, to contain the silicon as small pieces rather than to use a single, solid piece of silicon. This is apparently due to the fact that silicon is not a good conductor of electricity, and therefore the silicon dissolves chiefly from the area at the interface formed where the silicon enters the bath, due to the voltage drop over the length of the silicon. This results in the greatest deposition rate of silicon on the article being silicided on that area which is nearest to this interface, and the lowest deposition rate on the area farthest from this interface, even though both areas may be equidistant from the solid piece of silicon. By using the conductive container, the silicon dissolves uniformly from the entire surface and produces uniform coatings on small articles, providing the silicon electrode is spaced at least 0.25 inch, but preferably 1–2 inches from the article being silicided. In siliciding extremely large articles, for example, a sheet, in which one side may be shielded from a single silicon electrode, it may be desirable to use two or more silicon electrodes, which are judiciously spaced around the article to produce a uniform coating.

When an electrical circuit is formed external to the fused salt bath by joining the silicon to the metal to be silicided with an electrical conductor, electric current will flow through the circuit without any applied E.M.F. Apparently, the silicon acts as an anode by dissolving in the fused bath to produce electrons and silicon ions. The electrons flow through the external circuit formed by the conductor and the silicon ions, probably as fluosilicate ions, migrate through the fused salt bath to the metal to be silicided where the electrons discharge the silicon ions as a silicon coating. Because of the combined effect of the temperature of the bath and the fluxing action of the fused salts I use, the silicon immediately diffuses into the metal and forms a silicide as a very smooth, adherent, tough, corrosion resistant coating. The amount of current can be measured with an ammeter which enables one to readily calculate the amount of silicon being deposited on the article and converted to the silicide layer. Knowing the area of the article being plated, it is possible to calculate the thickness of the silicide coating deposited thereby permitting accurate control of the process to obtain any desired thickness of the silicide layer.

Although my process operates very satisfactorily without the impressing of an additional E.M.F. on the electrical circuit, I have found that it is possible to apply a small voltage when it is desired to increase the deposition rate of silicon without exceeding the diffusion rate of silicon into the article to form the silicide layer. The impressed E.M.F. should not exceed 0.5 volt, and usually falls between 0.1 and 0.3 volt. Voltages higher than this indicate one or more of the following conditions: high resistance somewhere in the circuit, impurities in the bath or on the surface of the electrodes which interfere with the chemical reactions at the electrodes, too fast deposition rates, loose or corroded electrical connections, etc. Although my process will operate satisfactorily when such conditions exist, it is desirable that they be corrected for more efficient operation. For example, when the anode is a solid rod of silicon, the voltage will sometimes exceed these limits due to the resistance in the circuit caused by the poor electrical conductivity of silicon. This may be eliminated, for example, by use of a porous graphite brasket containing pieces of silicon or providing the silicon with a core of a good conductor.

Total current densities, employing the voltages described above, should not exceed certain limits if high efficiency and high quality coatings are to be obtained. Since the diffusion rate of silicon into the cathode article varies from one material to another, with temperature and with the thickness of the coating being formed, there is also a variation in the upper limits of the current densities that may be employed. In general, however, I have found that at 700° C. current densities should not exceed approximately 0.2 ampere per square decimeter for metals in which diffusion is slow, for example, tantalum and tungsten, approximately 1 ampere per square decimeter for metals in which diffusion is moderate, for example, cobalt and niobium, and 5 amperes per square decimeter for metals in which diffusion is rapid, for example, iron and molybdenum. As the temperature is increased to 800° C., current densities can be correspondingly increased to values approximately 2 to 3 times those used at 700° C. Current densities in excess of these ranges lead to some formation of elemental silicon in either the form of non-adherent deposits or as granular or large crystalline deposits which give a rough, undesirable coating which tends to spall on further electrolysis or cooling to room temperature. Such results are desirable for the electrowinning of silicon from its compounds but are completely unsatisfactory for the production of smooth, adherent, silicide coatings on metals.

If an applied E.M.F. is used, the source, e.g., a battery or other source of direct current, should be connected in series with the external circuit so that the negative terminal is connected to the external circuit terminating at the metal being silicided and the positive terminal is connected to the external circuit terminating at the silicon electrode. In this way the voltages of both sources are algebraically additive.

As will be readily apparent to those skilled in the art, measuring instruments, such as voltmeters, ammeters, resistances, timers, etc., may be included in the external circuit to aid in control of the process.

The following examples are given by way of illustration and not by way of limitation. It is readily apparent that variations from the specific reaction conditions and reactants given may be readily used without departing from the scope of my invention.

EXAMPLE 1

Into a stainless steel vessel (11" deep x 4¾" I.D.) fitted with a nickel liner (10.5" deep x 4½" I.D.) was placed 2610 g. (45 moles) of reagent grade anhydrous KF, 1170 g. (45 moles) of reagent grade LiF and 420 g. (10 moles) of reagent grade NaF. The vessel was covered with a glass dome which contained two glass ports for electrodes and one port for a thermocouple well, and for connection to a vacuum source. A silicon rod (½" x ½" x 8") bound by Ni wire to a ¼" nickel rod was sealed in one port by a rubber tube. A similar arrangement held a molybdenum strip (2 cm. x 10 cm. x 0.025) in the second port.

The vessel was placed in a Nichrome wound alumina tube, electric furnace, evacuated and heated to a temperature of 630° C. where the salt mixture was a water clear melt. One mole of silicon tetrafluoride gas, from a supply cylinder, was rapidly dissolved in the fused salt giving a vapor pressure of 0.1–0.2 mm. at 630° above the melt. All reactions given below as examples were run at pressures of 0.1 to 1.0 mm. Other equally successful reactions have been made at atmospheric pressure in an inert atmosphere, but I prefer vacuum operations as the most convenient and consistent method for obtaining excellent results. The silicon anode and molybdenum cathode were lowered into the melt and the electrolysis carried out by impressing a moderate E.M.F. on the external electrical circuit connecting the anode and cathode. An ammeter and voltmeter were connected in the normal way in the external circuit. The pertinent data obtained was:

| Time (min.) | Temp., ° C. | Current density, amp./dm.² |
|---|---|---|
| 0 | 630 | 0.50 |
| 19 | 630 | 0.63 |
| 20 | 630 | 0.50 |
| 83 | 630 | 0.48 |
| 115 | 630 | 0.45 |
| 183 | 630 | 0.5 |

The electrodes were lifted from the salt and the melt cooled down in vacuum before opening the vessel. The molybdenum strip had gained 116 mg. or 80% of the theoretical. The coating showed a few spots where silicide formation had not occurred, which is typical of the first "clean-up" run.

EXAMPLE 2

Another molybdenum strip identical with the first was placed in the cathode port, the vessel evacuated, the salt remelted and another electrolysis made using the apparatus and general procedure of Example 1.

| Time (min.) | Temp., ° C. | Current density, amp./dm.² |
|---|---|---|
| 0 | 640 | 0.45 |
| 3 | 640 | 0.73 |
| 9 | 640 | 0.50 |
| 33 | 640 | 0.50 |
| 145 | 640 | 0.5 |
| 223 | 640 | 0.48 |

The molybdenum strip had gained 188 mg. of a theoretical 192 mg. or 98% of theory. The coating was smooth, uniform and showed no uncoated areas under microscopic examination. Metallographic examination showed the coating to be .8 to .9 mil thick, and X-ray examination showed it to be principally $MoSi_2$ with $Mo_3Si$ and $Mo_5Si_2$ also present.

EXAMPLE 3

In another run made in the same melt and an identical manner, except that the current density was increased 5 fold, the following results were obtained:

| Time (min.) | Temp., ° C. | Current density, amp./dm.² |
|---|---|---|
| 0 | 640 | 3.25 |
| 5 | 640 | 2.50 |
| 15 | 640 | 2.50 |
| 31 | 640 | 2.50 |
| 52 | 640 | 2.50 |
| 58 | 640 | 2.25–2.50 |

Observations in the melt toward the end of the electrolysis showed small silicon crystals forming on the surface of the cathode and then floating away. The electrode was smooth and uniformly coated but had gained only 159 mg. or 60% of theoretical. The low efficiency is typical of a current density which is too high for the temperature used.

EXAMPLE 4

The following run was made using the same general procedure as in Example 3, except that the temperature was raised to 700° C., with the following results:

| Time (min.) | Temp., ° C. | Current density, amp./dm.² |
|---|---|---|
| 0 | 700 | 2.50 |
| 6 | 700 | 2.50 |
| 51 | 700 | 2.63 |

The coating was perfectly smooth and uniform and the strip had gained the theoretical weight of 227 mg. silicon. The results of Examples 2, 3 and 4 demonstrate the effect of temperature on efficiency as a function of current density.

EXAMPLE 5

In another run, a strip of pure iron (2 cm. x 15 cm. x .025 cm.) was used as the cathode and silicided using the apparatus and general procedure of Example 1.

| Time (min.) | Temp., ° C. | Current density, amp./dm.$^2$ |
|---|---|---|
| 0 | 700 | 0.82 |
| 5 | 700 | 0.82 |
| 17 | 700 | 0.76 |
| 35 | 700 | 0.76 |

The weight gain of the piece of iron was 64.5 mg., approximately 93% of theory. The silicide coat was smooth and uniform. Metallographic examination proved it to be 0.5 mil thick, and X-ray examination showed it contained $Fe_3Si$. The dimensional increase resulting from the coating was 0.25 mil/side.

EXAMPLE 6

Two niobium wires (16 cm. x .050 cm.) were silicided in the same apparatus and general procedure described in Example 1, with the following results:

| Time (min.) | Temp., ° C. | Current density, amp./dm.$^2$ |
|---|---|---|
| 0 | 710 | 1.0 |
| 13 | 714 | .4 |
| 42 | 719 | .4 |
| 232 | 700 | .4 |

The two niobium wires gained 10.6 mg. of silicon, of the theoretical 20.8 mg. The coatings were light grey, hard, smooth, and very adherent. The wire increased .5 mil in thickness, and the coating was .5 mil thick. X-ray examination showed only the presence of $NbSi_2$. Niobium is an example of metals that silicide moderately easily.

EXAMPLE 7

A tungsten panel (1.5 cm. x 13 cm. x .025 cm.) was silicided under conditions similar to those used for niobium with the following results:

| Time (min.) | Temp., ° C. | Current density, amp./dm.$^2$ |
|---|---|---|
| 0 | 800 | 0.33 |
| 5 | 800 | 0.55 |
| 17 | 800 | 0.55 |
| 35 | 800 | 0.55 |
| 60 | 800 | 0.55 |

The weight gain of the tungsten panel was 14.5 mg. or 28% of theoretical. The panel was covered with a metallic silver-grey coating approximately 0.1 to 0.2 mil in thickness which was strongly adherent and would not break off on flexing. X-ray examination indicated $WSi_2$ in the coating, along with other unidentified structures. Tungsten is an example of metals which are slow or difficult to silicide.

EXAMPLE 8

A salt mixture was made in a Monel liner identical to those used in Examples 1–7, except that instead of absorbing silicon tetrafluoride gas into the molten salts in vacuum, one mole percent of potassium fluosilicate was added to the other salts. The following siliciding reaction was made on a molybdenum panel (2 cm. x 12 cm. x .075 cm.) in which all conditions were similar to those of the previous Examples 1–7, except that no voltage was impressed on the electrodes and the siliciding bath was operated as an electric cell by connecting the cathode to the anode through an ammeter. On open circuit the cell had a potential of 0.161 volt.

| Time (min.) | Temp., ° C. | Current density, amp./dm.$^2$ |
|---|---|---|
| 0 | 703 | .22 |
| 2 | 703 | .22 |
| 129 | 705 | .17 |
| 205 | 705 | 0.14 |

The molybdenum panel gained 76 mg. of silicon, of a theoretical 75–80 mg. The coating was 0.4–.5 mil thick, uniformly deposited, strongly adherent and could be flexed and bent to at least 1″ radius before the coating would crack.

EXAMPLE 9

An iron panel (1.8 cm. x 12.5 cm. x .025 cm.) was silicided without any impressed current under the general conditions of Example 8.

| Time (min.) | Temp., ° C. | Current density, amp./dm.$^2$ |
|---|---|---|
| 0 | 705 | 0.66 |
| 8 | 700 | 0.56 |
| 23 | 700 | 0.46 |
| 24* | 700 | 0 |
| 42* | 700 | 0 |
| 54* | 703 | 0 |
| 55 | 703 | 0.66 |
| 70 | 705 | 0.53 |
| 115 | 702 | 0.45 |

*Siliciding was interrupted for 30 minutes by opening the external circuit in order to note the rate of recovery of the open circuit voltage.

The iron strip gained 75 mg. of a theoretical 84 mg. The coating (1.2 mils thick) was smooth and uniform and could be flexed considerably without cracking. I have made coatings up to 7–8 mils in thickness on iron containing 1 to 3% silicon without any signs of spalling. X-ray examination of the thin coats has shown diffraction patterns of only $Fe_3Si$, whereas the thicker coats also contain $Fe_5Si_3$ and FeSi.

EXAMPLE 10

A piece of molybdenum-tungsten wire (11 cm. long x 0.75 cm. diameter, 50 wt. percent W, 50 wt. percent Mo) was silicided in the ternary salt mixture using the apparatus and general procedure of Example 8 under conditions similar to those of Examples 4 and 5.

| Time (min.) | Temp., ° C. | Current density, amp./dm.$^2$ |
|---|---|---|
| 0 | 700 | 0.19 |
| 38 | 700 | 0.19 |
| 55 | 700 | 0.19 |
| 58 | 700 | 0.19 |

The wire gained 10.7 mg. of a theoretical 12.5 mg. and increased approximately 0.8 mil in thickness. The coating was smooth, uniform, very adherent and approximately 0.7–0.8 mil in thickness. Oxidation test at elecvated temperatures showed that it gave considerable protection to the metal.

EXAMPLE 11

A molybdenum strip (13 cm. x 5 cm. x .150 cm.) was silicided using the general procedure of Example 8 except that the anode was a perforated carbon basket (⅞" O.D. x ⅝" I.D. x 5" length) filled with 4–8 mesh silicon granules, a moderate E.M.F. was applied to the electrical circuit, and the molybdenum strip was completely immersed in the salt by suspending it from a nickel rod with 20 mil tantalum wire which was also partly immersed.

| Time (min.) | Temp., ° C. | Current density, amp./dm.² |
|---|---|---|
| 0 | 695 | .8 |
| 5 | 700 | .8 |
| 7 | 700 | .5 |
| 100 | 700 | .5 |
| 200 | 700 | .5 |

The strip gained the theoretical amount of silicon, 636 mg., increased 1 mil in thickness, and had a smooth uniform silicide coating approximately 1 mil in thickness. The tantalum wire which held the molybdenum strip and was partially immersed had not been silicided at all, although it would have been in the absence of the molybdenum. This shows that in the presence of two metals, the silicide coating is formed with the metal which alloys more readily with silicon.

EXAMPLE 12

A 50/50 molar mixture (100 g.) of cesium fluoride and potassium fluoride was placed in a carbon linear inside an evacuated 2" quartz tube fitted with 2 electrode ports and a thermocouple well. At 640° the mixture was a water clear melt and readily absorbed 1000 cc. (STP) of silicon tetrafluoride having a residual pressure of less than .1 mm. A silicon anode and a palladium wire cathode (4 cm. length x .35 cm. dimeter) were then immersed in the salt and the electrolysis carried out in vacuum by applying a moderate E.M.F. to the electrical circuit.

| Time (min.) | Temp., ° C. | Current density, amp./dm.² |
|---|---|---|
| 0 | 640 | 2.0 |
| 20 | 640 | 4.0 |
| 32 | 640 | 4.0 |

The palladium rod gained 20 mg. of a theoretical 28 mg., increased 3 mils in thickness, and was uniformly covered with a hard, grey, brittle silicide coating, 3 mls thick.

Table I summarizes the results of siliciding several other pure metals and alloys in the same apparatus and general procedure described in Example 1, except that 1 mole percent of potassium fluosilicate was added to the salt instead of 1 mole percent of gaseous silicon tetrafluoride. All the coatings were smooth, uniform and adherent, except gold, on which some of the gold silicide melted because of the formation of the eutectic melting at 370° C. containing 31 atomic percent silicon. This melting can be prevented by use of a lower current density or by carrying out the siliciding without an applied E.M.F.

TABLE I

| Ex. | Metal | Temp., ° C. | Current density amp./dm.² | Efficiency, percent | Description of coating |
|---|---|---|---|---|---|
| 13 | Vanadium | 700 | 1 | 30 | 0.3 mil coat, dark grey, flexible, $VSi_2$ and probably $V_5Si_3$ present. |
| 14 | Chromium | 700 | 1 | 100 | 1 mil coat, light grey, moderately flexible. |
| 15 | Cobalt | 750 | .5 | 50 | 0.5 mil coat, blue grey, very flexible, very hard. |
| 16 | Copper | 600 | .8 | 100 | 2 mil coat, shiny fine crystalline surface, brittle. |
| 17 | Rhodium | 700 | 3 | 25 | .1 mil coat, dark grey, very brittle. |
| 18 | Palladium | 700 | 1 | 100 | 2 mil coat, dull black, brittle. |
| 19 | Silver | 700 | 1 | 5 | <.1 mil coat, dull black, brittle. |
| 20 | Tantalum | 800 | .4 | 10 | 0.1 mil coat, light grey, flexible. |
| 21 | Rhenium | 700 | .6 | 12 | .15 mil coat, shiny black, flexible, very hard, $ReSi_2$. |
| 22 | Iridium | 700 | 2 | 100 | 0.5 mil coat, dark grey, flexible. |
| 23 | Platinum | 700 | 1 | 100 | 1 mil coat, dull black, flexible, PtSi, $Pt_2Si$ and $Pt_5Si_2$ present. |
| 24 | Gold | 700 | 1 | 100 | Some of the silicide coating melted and formed a globule of the gold silicon autectic on end of strip. Gain in weight 9.5 mg. Surface of gold harder than untreated gold. |
| 25 | Inconel X (70% Ni, 15% Cr, 7% Fe, 2.5% Ti, 1% Ta& Nb, .7% Mn, .7% Al, .5% Si, 37% C). | 710 | 1 | 90 | 1 mil coat, light grey, moderately flexible. |
| 26 | Hastelloy X (45% Ni, 22% Cr, 23% Fe, 9% Mo). | 700 | 1 | 54 | Do. |
| 27 | Silicon-iron (3.5% Si). | 700 | .75 | 100 | 8 mil coat, dull grey, brittle. |
| 28 | Molybdenum-titanium (0.5% Ti). | 700 | 1 | 100 | 6 mil coat, shiny, flexible. |
| 29 | Chronium-iron (17% Cr). | 710 | .5 | 90 | 2 mil coat, light grey, moderately flexible. |
| 30 | S 816 (38% Co, 20% Ni, 20% Cr, 6% Fe, 5% W, 4% Mo, 4% Ta& Nb, 2% Mn, 1% Si). | 700 | .5 | 90 | 1 mil coat, grey, flexible. |

EXAMPLE 31

A molybdenum wire 16 inches by 20 mils long was formed into a hairpin loop and silicided, except for one inch at the two ends, using the general method of Example 1. The current density was 2 amperes per square decimeter and process time was 172 minutes, using a fused bath temperature of 660° C.

The silicide coating was 1.3 to 1.5 mils thick. This hairpin loop with its silicide coating was attached to water cooled electrodes and heated in air to a temperature of 1000° C. by passing an electric current through the wire. The source was 110 volts A.C. which was regulated with a variable transformer to maintain a constant surface temperature. At the end of 1,003 hours, there was no sign of failure or change in electrical resistance. Under similar conditions a molybdenum wire without the above silicide coating would have failed in less than 1 minute at 1000° C. The temperature was raised to 1200°

C. for 24 hours and then to 1300° C. for 11 hours at which time the wire burned out due to a spot failure.

The above examples have illustrated the preferred embodiments of my invention. However, it will be readily apparent to those skilled in the art that other modifications can be made without departing from the scope of the present invention. For example, the silicide coating can be formed on a metal which is itself a coating on the surface of another metal, for example an electroplate on a metal base, e.g., chromium on iron.

Because the tough, adherent, corrosion resistant properties of the silicide coatings are uniform over the entire treated area, the silicide coated metal compositions prepared by my process have a wide variety of uses. They can be used to fabricate reaction vessels for chemical reactions, to fabricate heating elements for use in air to prevent oxidative attack of the element at high temperature, to make turbine blades for both gas and steam driven turbines to resist the corrosive and erosive effects of the gaseous driving fluid, to make gears, bearings, and other articles requiring hard, wear resistant surfaces. Other uses will be readily apparent to those skilled in the art as well as other modifications and variations of the present invention in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A method of forming a silicide coating on a metal composition having a metal melting point of at least 600° C., at least 50 mol percent of said metal composition being at least one of the metals selected from the group of metals whose atomic numbers are 23–29, 41–47, and 73–79, said method comprising (1) forming an electric cell containing said metal composition as the cathode joined through an external electrical circuit to a silicon anode and a fused salt electrolyte composed essentially of at least one alkali metal fluoride and from 0.5 to 50 mol percent of at least one alkali metal fluosilicate, said electrolyte being maintained at a temperature of [about 600–800° C., but below the melting point of said metal composition] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, and (3) interrupting the flow of electrical current after the desired thickness of the silicide coating is formed on the metal object.

2. The silicide coated product obtained by the method of claim 1.

3. The process of claim 1 wherein the absence of oxygen is obtained by use of a vacuum.

4. The process of claim 1 wherein the total electrical energy is self-generated within the electric cell.

5. The process of claim 1 wherein a portion of the direct current is supplied by an external E.M.F. impressed upon the electrical circuit.

6. A method of forming a silicide coating on a metal composition having a melting point of at least 600° C., at least 90 mol percent of said metal composition being at least one of the metals selected from the group of metals whose atomic numbers are 23–29, 41–27, and 73–79, said method comprising (1) forming an electric cell containing said metal composition as the cathode joined through an external electrical circuit to a silicon anode and a fused salt electrolyte composed essentially of at least one alkali metal fluoride and from 0.5 to 50 mol percent of at least one alkali metal fluosilicate, said electrolyte being maintained at a temperature of [about 600–800° C., but below the melting point of said metal composition] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the metal composition, and (4) removing the metal composition with its integrant silicide coating from the fused salt electrolyte.

7. The method of claim 6 wherein the metal composition is at least 90 mol percent iron.

8. The method of claim 7 wherein the metal composition is an iron-silicon alloy.

9. A method of forming a silicide coating on an iron-cobalt-nickel alloy which comprises (1) forming an electric cell containing said alloy as the cathode joined through an external electrical circuit to a silicon anode and a fused salt electrolyte composed essentially of at least one alkali metal fluoride and from 0.5 to 50 mol percent of at least one alkali metal fluosilicate, said electrolyte being maintained at a temperature of [about 600–800°] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the alloy, and (4) removing the alloy with its integrant silicide coating from the fused salt electrolyte.

10. A method of forming a silicide coating on molybdenum which comprises (1) forming an electric cell containing molybdenum as the cathode joined through an external electrical circuit to a silicon anode and a fused salt electrolyte composed essentially of at least one alkali metal fluoride and from 0.5 to 50 mol percent of at least one alkali metal fluosilicate, said electrolyte being maintained at a temperature of [about 600–800°] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the molybdenum, and (4) removing the molybdenum with its integrant silicide coating from the fused salt electrolyte.

11. A method of forming a silicide coating on cobalt which comprises (1) forming an electric cell containing cobalt as the cathode joined through an external electrical circuit to a silicon anode and a fused salt electrolyte composed essentially of at least one alkali metal fluoride and from 0.5 to 50 mol percent of at least one alkali metal fluosilicate, said electrolyte being maintained at a temperature of [about 600–800°] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the cobalt, and (4) removing the cobalt with its integrant silicide coating from the fused salt electrolyte.

12. A method of forming a silicide coating on niobium which comprises (1) forming an electric cell containing niobium as the cathode joined through an external electrical circuit to a silicon anode and a fused salt electrolyte composed essentialy of at least one alkali metal fluoride and from 0.5 to 50 mol percent of at least one alkali metal fluosilicate, said electrolyte being maintained at a temperature of [about 600–800°] *at least 600° C., but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the niobium, and (4) removing the niobium with its integrant silicide coating from the fused salt electrolyte.

13. A method of forming a silicide coating on rhenium which comprises (1) forming an electric cell containing rhenium as the cathode joined through an external electrical circuit to a silicon anode and a fused salt electrolyte consisting essentially of at least one alkali metal fluoride and from 0.5 to 50 mol percent of at least one alkali metal fluosilicate, said electrolyte being maintained at a temperature of [about 600–800°] *at least 600°* C., *but below the melting point of said metal composition* in the substantial absence of oxygen, (2) controlling the current flowing in said electric cell so that the current density of the cathode does not exceed 5 amperes per square decimeter during the formation of the silicide coating, (3) interrupting the flow of electrical current after the desired thickness of silicide coating is formed on the rhenium, and (4) removing the rhenium with its integrant silicide coating from the fused salt electrolyte.

References Cited in the file of this patent or the original patent

UNITED STATES PATENTS

| | | |
|---|---|---|
| 1,801,808 | Fischer | Apr. 21, 1931 |
| 1,845,978 | Hosenfeld | Feb. 16, 1932 |
| 2,033,172 | Andrieux | Mar. 10, 1936 |
| 2,709,154 | Hansgirg | May 24, 1955 |